Patented Feb. 10, 1948

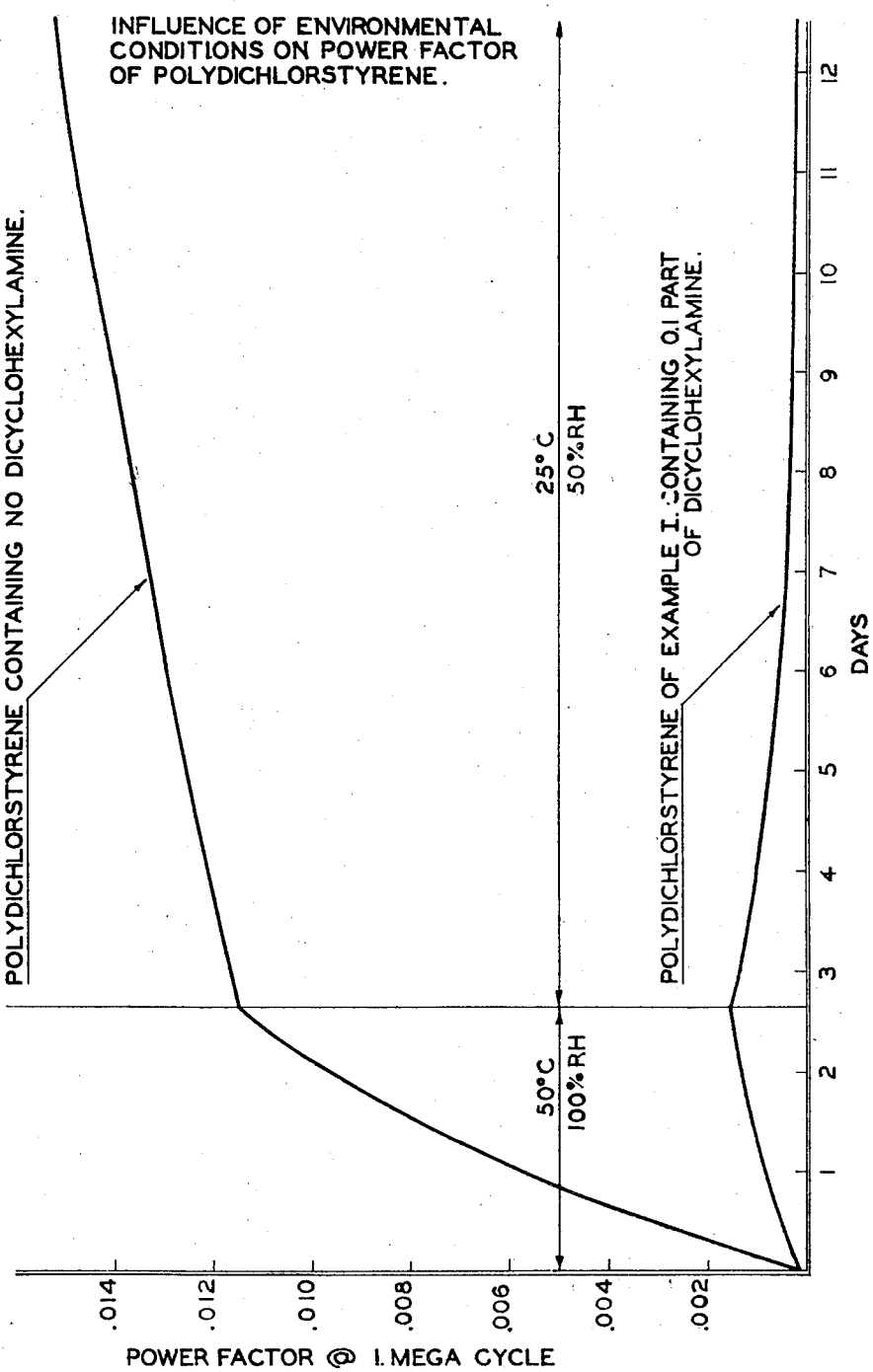

2,435,767

UNITED STATES PATENT OFFICE 2,435,767

HALOSTYRENE POLYMERS

Costas H. Basdekis, Springfield, Mass., assignor to Monsanto Chemical Company, St. Louis, Mo., a corporation of Delaware Application March 23, 1945, Serial No. 584,388

4 Claims. (Cl. 260—74)

This invention relates to a process for improving the physical properties of halogen-containing polystyrene. More particularly, this invention relates to a process for improving the electrical properties of polymerized chlorostyrenes.

Polymerized ha'ostyrenes are of considerable importance in the electrical insulation field due to their relatively high dielectric strength, low power factor and chemical inertness. It has been found that the polymerized halostyrenes often develop "flecks" on exposure to high humidity. The "flecks" appear to be internal fissures which are caused by or accentuated by high humidity. On appearance of the "flecks," the power factor is markedly increased and the value of the material is greatly impaired for use in electrical insulation.

An object of this invention is to improve the electrical properties of polymerized halostyrenes.

A further object is to prevent the impairment of the electrical properties of polymerized halostyrenes when exposed to high humidities.

Another object is to prevent the development or accentuation of "flecks" in polymerized halostyrenes.

These and other objects are attained by polymerizing the halostyrene monomers in the presence of small amounts of dicyclohexylamine.

The following example is given by way of illustration of this invention and is not intended to limit the scope thereof. Where parts are mentioned, they are parts by weight.

Example I 0.1 part of dicyclohexylamine was mixed with 100 parts of monomeric 2,5-dichlorostyrene. This mixture was heated at 90° C. for 24 hours and the temperature was then raised to 160° C. to advance the polymerization of the chlorostyrene to about 98% completion. Circular discs 2 inches in diameter were molded from the polymer and power factor readings taken before humidifying, at several intervals during treatment at 50° C. with 100% relative humidity followed by further treatment at 25° C. with 50% relative humidity.

In the accompanying drawing, Figure 1 is a graph in which the power factor readings taken during the treatment at 50° C. with 100% R. H. followed by 25° C. with 50% R. H. are plotted against duration of the treatment. For comparison a similar curve is shown for the behavior of unmodified polymerized 2,5-dichlorostyrene. It can be seen from the graph that the dicyclohexylamine greatly depresses the increase in power factor at high humidity as compared to the unmodified polymer and that the power factor of the modified polymer, when further subjected to a lower relative humidity decreases nearly to that of the starting polymer in contrast to the unmodified polymer for which the power factor continues to increase even though the relative humidity is lowered.

When 2,4-dichlorostyrene and parachlorostyrene were modified with dicyclohexylamine, similar results were obtained.

Dicyclohexylamine is a clear practically colorless liquid having a specific gravity of 0.916–0.920 at 15.5/15.5° C. and a pH in solution of 9.8 to 10.4. It is easily dispersible in halostyrene monomers using conventional mixing means. When clear, colorless polymers are desired the proportion of dicyclohexylamine may be varied from 0.01 to 1.0 part per 100 parts of halostyrene monomer. More than 1 part of dicyclohexylamine per 100 parts of halostyrene monomer may be used although it tends to yield a cloudy product which would not be desirable for some uses.

In place of dicyclohexylamine which has the following structure,

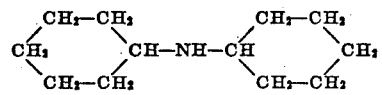

its derivatives in which one or more of the hydrogen atoms has been replaced by an alkyl group such as methyl, ethyl, propyl, butyl, etc.

This halogenated styrene which can be modified by the process of this invention are styrenes in which one or more of the hydrogen atoms attached to the benzene ring are substituted by a halogen atom such as fluorine, chlorine and bromine.

Various conventional modifying agents may be added to the halostyrene polymers of this invention such as fillers, pigments, dyestuffs, etc.

The modification of halogenated styrenes with dicyclohexylamine and its derivatives is particularly advantageous for producing electrical insulating materials having a low power factor and which are resistant to the effects of high humidity.

The foregoing description is given in illustration and is not intended to be limitative of this invention, as set forth in the appended claims.

What is claimed is:

1. A composition comprising 100 parts of a polymeric halogenated styrene taken from the group consisting of polymerized mono-, and di-, fluoro bromo, and chloro styrenes and from 0.01 to 1.0 part of a member of the group consisting of dicyclohexylamine and its alkyl substitution products.

2. A composition comprising 100 parts of a polymeric dichlorostyrene and from 0.01 to 1.0 part of a member of the group consisting of dicyclohexylamine and its alkyl substitution products.

3. A composition comprising 100 parts of a polymeric monochlorostyrene and from 0.01 to 1.0 part of a member of the group consisting of dicyclohexylamine and its alkyl substitution products.

4. A composition comprising 100 parts of polymerized 2,5 dichlorostyrene and from 0.01 to 1.0 part of dicyclohexylamine.

COSTAS H. BASDEKIS.

REFERENCES CITED

The following references are of record in the file of this patent:

UNITED STATES PATENTS

| Number | Name | Date |
|---|---|---|
| 2,287,188 | Matheson | June 23, 1942 |

FOREIGN PATENTS

| Number | Country | Date |
|---|---|---|
| 119,624 | Australia | Mar. 15, 1945 |